(12) United States Patent
Huang (10) Patent No.: US 11,579,898 B2
(45) Date of Patent: *Feb. 14, 2023

(54) METHOD AND DEVICE FOR SYNCHRONOUSLY STARTING APPLICATION BASED ON FINGERPRINT RECOGNITION

(71) Applicant: SHANGHAI HARVEST INTELLIGENCE TECHNOLOGY CO., LTD, Shanghai (CN)

(72) Inventor: Jinadong Huang, Shanghai (CN)

( * ) Notice: Subject to any disclaimer, the term of this patent is extended or adjusted under 35 U.S.C. 154(b) by 215 days.

This patent is subject to a terminal disclaimer.

(21) Appl. No.: 16/469,655

(22) PCT Filed: Mar. 6, 2018

(86) PCT No.: PCT/CN2018/078088
§ 371 (c)(1),
(2) Date: Jun. 14, 2019

(87) PCT Pub. No.: WO2018/177082
PCT Pub. Date: Oct. 4, 2018

(65) Prior Publication Data
US 2020/0081723 A1    Mar. 12, 2020

(30) Foreign Application Priority Data
Mar. 29, 2017 (CN) .......................... 201710197870.6

(51) Int. Cl.
*G06V 40/13* (2022.01)
*G06F 9/445* (2018.01)
(Continued)

(52) U.S. Cl.
CPC ............ *G06F 9/4451* (2013.01); *G06V 40/13* (2022.01); *G06V 40/1365* (2022.01); *G06F 3/04817* (2013.01); *G06F 21/32* (2013.01)

(58) Field of Classification Search
CPC ...................................................... G06F 21/32
See application file for complete search history.

(56) References Cited

U.S. PATENT DOCUMENTS

8,266,550 B1 * 9/2012 Cleron ................ G06F 3/04845
715/863
9,245,167 B2 * 1/2016 Carver ............... G06K 9/00046
(Continued)

Primary Examiner — Joseph R Haley (57) ABSTRACT

A fingerprint recognition-based synchronous application starting method and device. By providing a sensing unit below a fingerprint recognition area of a display unit, when a user needs to start an application, the user only needs to synchronously click an icon corresponding to an application to be started in the fingerprint recognition area of the screen; the sensing unit acquires fingerprint information of the user, and then compares the acquired fingerprint information with preset fingerprint information, to start the application or perform unlocking. Compared with an existing approach for a mobile apparatus to start an application by means of fingerprint recognition, the method and device improves the operability of application icons on a screen and enhances user experience, and can also effectively reduce the overall thickness of a mobile apparatus, making the mobile apparatus thinner and lighter to meet the market demands.

26 Claims, 5 Drawing Sheets (51) Int. Cl.
  *G06V 40/12* (2022.01)
  *G06F 3/04817* (2022.01)
  *G06F 21/32* (2013.01)

(56) References Cited

U.S. PATENT DOCUMENTS

| | | | |
|---|---|---|---|
| 9,946,861 B2* | 4/2018 | Yoon | G06F 21/32 |
| 2015/0213321 A1* | 7/2015 | Okazaki | G06K 9/3216 |
| | | | 382/116 |
| 2017/0161543 A1* | 6/2017 | Smith | G06K 9/0004 |
| 2018/0224999 A1* | 8/2018 | Lee | G06F 3/0488 |
| 2019/0354661 A1* | 11/2019 | Lu | G06F 21/84 |
| 2020/0019684 A1* | 1/2020 | Huang | G06F 3/0486 |

\* cited by examiner

Device for starting an application based on fingerprint recognition

Display unit 101

Sensing unit 102

Backlight unit 103

Fingerprint information setting unit 104

Operating instruction receiving unit 105

Processing unit 106

METHOD AND DEVICE FOR SYNCHRONOUSLY STARTING APPLICATION BASED ON FINGERPRINT RECOGNITION

BACKGROUND OF THE INVENTION

1. Field of the Invention

The present invention relates to the field of electronic equipment control, and particularly relates to a method and a device for synchronously starting an application based on fingerprint recognition.

2. Description of the Prior Art

With development of science and technology and advances in technology, touch screens have been widely applied in devices with human-computer interaction interfaces, such as operating screens of industrial computers, touch screens of tablet computers and smartphones and the like. Since these devices are often accompanied by a large amount of user information during use, protection for information security is particularly important. Fingerprint recognition encryption is an important one of many information security protection modes.

Most of the existing fingerprint recognition technologies still stay in a boot-up unlocking or screen unlocking function of a terminal, so a special button (e.g., the home button of iPhone) needs to be set, and a capacitive fingerprint recognition sensor is placed under the button for collecting fingerprints left by a user on the button. Since the capacitive fingerprint recognition sensor needs to be set, the complexity for processing and installation of the terminal is increased on one hand, and the overall thickness of the terminal is increased on the other hand, thereby limiting the development of thinning, full-screen and rollable application of a terminal screen.

At present, encryption and starting of applications mostly still stay in entering a password or presetting a sliding track to complete screen unlocking. Compared with the biometrics-based fingerprint recognition, these encryption modes are more easily cracked and cannot guarantee the information security. Even if the foregoing fingerprint recognition mode is introduced, the fingerprint must be verified by a sensor outside a display screen to start the application, so the process of starting the application is still limited by shortcomings of the sensor mentioned above, and the operation experience of the user cannot be improved.

SUMMARY OF THE INVENTION

A technical problem to be solved by the present invention is to provide a technical solution for starting an application based on fingerprint recognition, for solving a problem of high risk of information being easily cracked in an existing mode for starting the application, improving a device with a fingerprint recognition function to realize user experience of thinned and full-screen human-computer interaction interface, and simultaneously satisfying multiple needs of privacy security and sensory experience of the user.

In order to solve the above technical problem, the technical solution adopted by the present invention is a method for synchronously starting an application based on fingerprint recognition. The method is applied to a device for synchronously starting the application based on fingerprint recognition. The device includes a display unit and sensing units, wherein the display unit is provided with a fingerprint recognition region; the sensing units are located below the fingerprint recognition region for acquiring fingerprint information on the fingerprint recognition region; the fingerprint recognition region includes at least one application icon; and each application icon corresponds to one application. The method includes the following steps:

presetting a correspondence between the application icon and the fingerprint information;

receiving an operating instruction of the user for the application icon in the fingerprint recognition region, and acquiring the fingerprint information of a current user;

judging whether the acquired fingerprint information is successfully matched with the preset fingerprint information corresponding to the application icon; and if yes, starting the application corresponding to the application icon, otherwise not starting the application corresponding to the application icon.

Further, the step of "presetting the correspondence between the application icon and the fingerprint information" includes:

receiving a setting instruction of the user and displaying the fingerprint recognition region;

acquiring and saving the fingerprint information of the user on the fingerprint recognition region;

displaying an application list, receiving a selecting instruction of the user for the application icon, and establishing and saving the correspondence between the selected application icon and the acquired fingerprint information.

Further, the device includes a storage unit. The step of "acquiring and saving the fingerprint information of the user on the fingerprint recognition region" includes:

judging whether the fingerprint information in a user setting process is stored in the storage unit; when a judgment result is yes, prompting the user that the fingerprint information is entered; and when the judgment result is no, saving the fingerprint information to the storage unit.

Further, the step of "receiving the operating instruction of the user for the application icon in the fingerprint recognition region" includes:

receiving a clicking instruction of the user for the application icon and triggering a starting instruction for the application.

Further, the method includes the following step:

sending prompt information when the preset fingerprint information matched with the acquired fingerprint information is not recognized.

Further, the prompt information includes one or more of voice prompt information, image prompt information, light prompt information and video prompt information.

Further, the method includes:

starting an application icon sorting function to sort the application icon when a time of acquiring the fingerprint information of the user on the fingerprint recognition region exceeds a preset time threshold.

Further, the process of "sorting the application icon" includes: receiving a coordinate movement instruction of the user for the application icon, and moving the application icon from a current position to a target position.

Further, the display unit includes an Active Matrix Organic Light Emitting Diode (AMOLED) display screen or a Liquid Crystal Display (LCD) screen.

Further, when the display unit is the LCD screen, a backlight unit is further arranged below the sensing units; and the sensing units are arranged between the backlight unit and the LCD screen.

Further, each sensing unit includes a TFT (Thin Film Transistor) image sensing array film.

Further, the application includes one or more of images, videos, audios and mobile terminal software.

Further, the fingerprint recognition region includes a plurality of fingerprint recognition sub-regions; and one sensing unit is correspondingly arranged below each of the fingerprint recognition sub-regions.

Further, the device includes a sensing unit control circuit. The method further includes:

receiving a starting instruction of the user for the fingerprint recognition sub-regions; turning on the sensing units below the fingerprint recognition sub-regions by the sensing unit control circuit; receiving a turn-off instruction of the user for the fingerprint recognition sub-regions; and turning off the sensing units below the fingerprint recognition sub-regions by the sensing unit control circuit.

The inventor also provides a device for synchronously starting an application based on fingerprint recognition. The device includes a display unit and sensing units, wherein the display unit is provided with a fingerprint recognition region; the sensing units are located below the fingerprint recognition region for acquiring fingerprint information on the fingerprint recognition region; the fingerprint recognition region includes at least one application icon; and each application icon corresponds to one application. The device further includes a fingerprint information setting unit, an operating instruction receiving unit and a processing unit.

The fingerprint information setting unit is configured to preset a correspondence between the application icon and the fingerprint information.

The operating instruction receiving unit is configured to receive an operating instruction of the user for the application icon in the fingerprint recognition region.

The sensing units are configured to acquire the fingerprint information of a current user located on the fingerprint recognition region.

The processing unit is configured to judge whether the acquired fingerprint information is successfully matched with the preset fingerprint information corresponding to the application icon, and if yes, start the application corresponding to the application icon, otherwise not start the application corresponding to the application icon.

Further, "the fingerprint information setting unit is configured to preset the correspondence between the application icon and the fingerprint information" includes:

the operating instruction receiving unit is configured to receive a setting instruction of the user; the display unit is configured to display the fingerprint recognition region;

the sensing units are configured to acquire and save the fingerprint information of the user on the fingerprint recognition region;

the display unit is configured to display an application list; the operating instruction receiving unit is configured to receive a selecting instruction of the user for the application icon; and the processing unit is configured to establish and save the correspondence between the selected application icon and the acquired fingerprint information.

Further, the device includes a storage unit. The processing unit is further configured to judge whether the fingerprint information in a user setting process is stored in the storage unit after the sensing units acquire the fingerprint information of the user on the fingerprint recognition region, prompt the user that the fingerprint information is entered when a judgment result is yes, and save the fingerprint information to the storage unit when the judgment result is no.

Further, "the operating instruction receiving unit is configured to receive the operating instruction of the user for the application icon in the fingerprint recognition region" includes: the operating instruction receiving unit is configured to receive a clicking instruction of the user for the application icon and trigger a starting instruction for the application.

Further, the processing unit is configured to send prompt information when the preset fingerprint information matched with the acquired fingerprint information is not recognized.

Further, the prompt information includes one or more of voice prompt information, image prompt information, light prompt information and video prompt information.

Further, the processing unit is configured to start an application icon sorting function to sort the application icon when a time of acquiring the fingerprint information of the user on the fingerprint recognition region exceeds a preset time threshold.

Further, "the processing unit is configured to sort the application icon" includes: the processing unit is configured to receive a coordinate movement instruction of the user for the application icon and move the application icon from a current position to a target position.

Further, the display unit includes an AMOLED display screen or an LCD screen.

Further, when the display unit is the LCD screen, a backlight unit is further arranged below the sensing units; and the sensing units are arranged between the backlight unit and the LCD screen.

Further, each sensing unit includes a TFT image sensing array film.

Further, the application includes one or more of images, videos, audios and mobile terminal software.

Further, the fingerprint recognition region includes a plurality of fingerprint recognition sub-regions; and one sensing units are correspondingly arranged below each of the fingerprint recognition sub-regions.

Further, the device includes a sensing unit control circuit. The operating instruction receiving unit is further configured to receive a starting instruction of the user for the fingerprint recognition sub-regions. The sensing unit control circuit is configured to turn on the sensing units below the fingerprint recognition sub-regions. The operating instruction receiving unit is configured to receive a turn-off instruction of the user for the fingerprint recognition sub-regions. The sensing unit control circuit is configured to turn off the sensing units below the fingerprint recognition sub-regions by the sensing unit control circuit.

The present invention has the following advantages: the sensing units are arranged below the fingerprint recognition region of the display unit, so when a user needs to start the application, the sensing units may immediately collect the fingerprint information of the user by only clicking on an icon corresponding to the application to be started on the fingerprint recognition region of the screen, and then compare the collected fingerprint information with the preset fingerprint information to implement starting or unlocking of the application. Compared with a mode that the fingerprint must be verified by the sensor outside the display screen before starting the application in existing mobile terminal equipment, the method provided by the invention improves operability of the user to directly unlock the application icon on the screen by fingerprint and improves the user experience on one hand, and may realize a function of fingerprint recognition in the screen by means of the operability for full-screen, thinned and lightened terminals to meet the needs of the market on the other hand.

LIST OF REFERENCE NUMERALS 101. display unit;
102. sensing unit;
103. backlight unit;
104. fingerprint information setting unit;
105. operating instruction receiving unit;
106. processing unit; and
107. storage unit.

DESCRIPTION OF THE INVENTION

Technical contents, structural features, implemented objectives and effects of the present invention will be described in detail below in combination with embodiments and with reference to the accompanying drawings.

Figure 1:
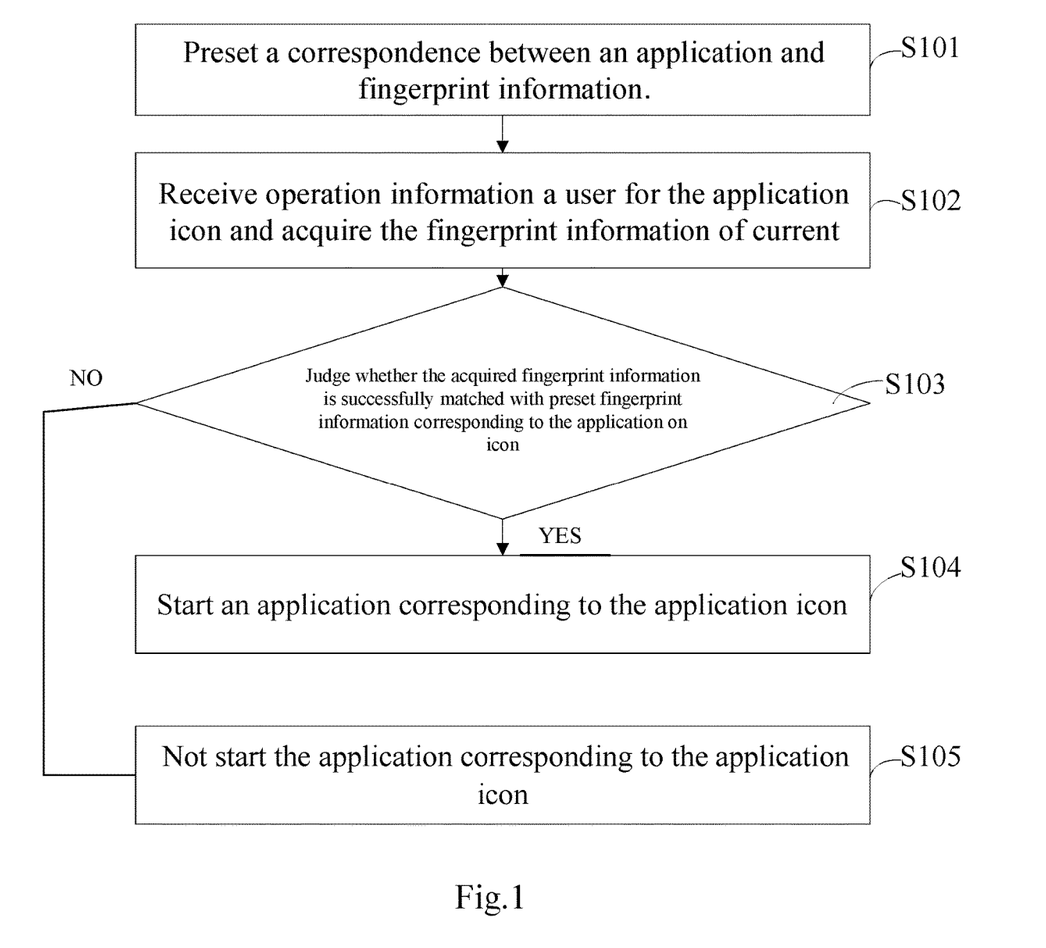
FIG. 1 is a flow chart of a method for synchronously starting an application based on fingerprint recognition according to an embodiment of the present invention.

As seen from FIG. 1, it is a flow chart of a method for synchronously starting an application based on fingerprint recognition according to an embodiment of the present invention. The method is applied to a device for synchronously starting the application based on fingerprint recognition. The device is electronic equipment with a touch display screen, such as a mobile phone, a table computer, a personal digital assistant and other smart mobile equipment, and may also be a personal computer, a computer for industrial equipment or other electronic equipment.

The device includes a display unit and sensing units, wherein the display unit is provided with a fingerprint recognition region; and the sensing units are located below the fingerprint recognition region for acquiring fingerprint information on the fingerprint recognition region. In the present embodiment, the display unit includes an AMOLED display screen or an LCD screen. In other embodiments, the display unit may also be other electronic components having a display function. The fingerprint recognition region includes at least one application icon; and each application icon corresponds to an application. The method includes the following steps:

first, the process proceeds to a step S101 of presetting a correspondence between the application icon and the fingerprint information. The application icon may be a thumbnail or shortcut of the application; and a starting instruction for the application is triggered when a user clicks on the application icon. The preset fingerprint information is the fingerprint information entered and stored by the user in advance, wherein each fingerprint information may be associated with one or more application icons; and the correspondence between the application icon and the fingerprint information is stored. The correspondence between the application icon and the fingerprint information may be stored in a storage unit of the device, such as a memory of the mobile phone or a hard disk of the computer, and may also be stored in the storage unit of a server. The device only needs to establish a communication connection with the server and then acquires the prestored fingerprint information from the server when the correspondence between the preset application icon and the fingerprint information needs to be acquired. The communication connection includes a wired communication connection or a wireless communication connection.

Then, the process proceeds to a step S102 of receiving an operating instruction of the user for the application icon in the fingerprint recognition region and acquiring the fingerprint information of a current user. In the present embodiment, a coverage of the sensing units is adapted to a size of the display unit, so that the sensing units can collect the fingerprint information of the user in time when the user clicks on and triggers the application icon at any corner of the display unit.

In some embodiments, the step of "receiving the operating instruction of the user for the application icon in the fingerprint recognition region" includes: a clicking instruction of the user for the application icon is received; and the starting instruction for the application is triggered. Specifically, the step may be implemented in a mode of setting the correspondence between the number of contacts of the application icon and a touch command, receiving the clicking instruction and triggering the starting instruction for the application when detecting that the number of contacts meets requirements.

In some other embodiments, the step of "receiving the operating instruction of the user for the application icon in the fingerprint recognition region" further includes: triggering the starting instruction in a mode of setting a preset button, e.g., a "start" button may be additionally displayed on the screen, and clicking on the "start" button to trigger the starting instruction for the application corresponding to the application icon after the user clicks to select the application icon to be moved. In addition, for the device with a mechanical button, the operating instruction of the user on the mechanical button may also be received to trigger the starting instruction for the application after the user selects the application icon corresponding to the application to be unlocked or started.

Then, the process proceeds to a step S103 of judging whether the acquired fingerprint information is successfully matched with the preset fingerprint information corresponding to the application icon, and if yes, proceeding a step S104 of starting the application corresponding to the application icon, otherwise proceeding a step S105 of not starting the application corresponding to the application icon. Comparison of the fingerprint information may be implemented by a fingerprint recognition algorithm, which may be stored in the storage unit of the device. A processor of the device will take the fingerprint recognition algorithm in the storage unit after the sensing units acquire the fingerprint information on the fingerprint recognition region, and compare the acquired fingerprint information with the preset fingerprint information to judge whether the two are matched. The fingerprint recognition algorithm includes steps of fingerprint image preprocessing, data feature extraction, feature matching, fingerprint recognition, etc., and may be implemented by various algorithms. These algorithms are mature existing arts, have been applied to various encryption and decryption fields, and are no longer repeated herein.

The above method has the following advantages: the sensing units are arranged below the fingerprint recognition region of the display unit, so when the user needs to start the application, the sensing units may immediately collect the fingerprint information of the user by only clicking on an icon corresponding to the application to be started on the fingerprint recognition region of the screen, and then compare the collected fingerprint information with the preset fingerprint information to implement starting or unlocking of the application. Compared with a mode that the fingerprint must be verified by the sensor outside the display screen before starting the application in existing mobile equipment, the method provided by the invention expands an operable space of the user on the screen, improves operability of the user to directly unlock the application icon on the screen by the fingerprint and improves the user experience on one hand, and may realize a function of fingerprint recognition in the screen by means of the operability for full-screen, thinned and lightened terminals to meet the needs of the market on the other hand.

Figure 2:
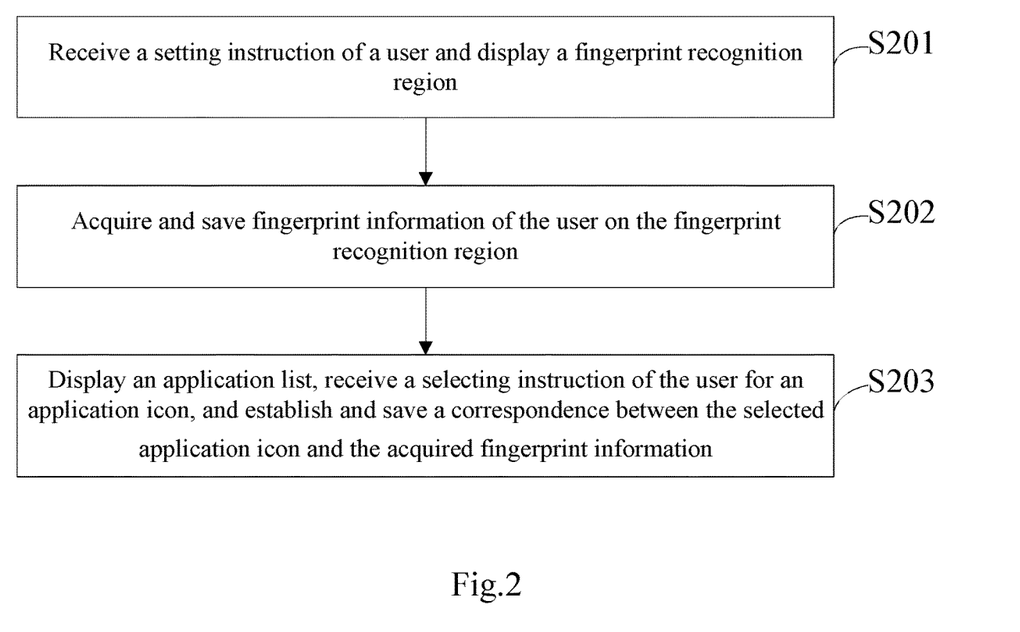
FIG. 2 is a flow chart of a method for synchronously starting an application based on fingerprint recognition according to another embodiment of the present invention.

As seen from FIG. 2, it is a flow chart of a method for synchronously starting an application based on fingerprint recognition according to another embodiment of the present invention. The step of "presetting the correspondence between the application icon and the fingerprint information" includes:

first, the process proceeds to a step S201 of receiving a setting instruction of the user and displaying the fingerprint recognition region. The setting instruction may be triggered by clicking on a button in a setting column on the screen by the user. The device will display the fingerprint recognition region after receiving the setting instruction so that the user can input the fingerprint information. In the present embodiment, the step of displaying the fingerprint recognition region may include: the brightness of the fingerprint recognition region is enhanced or a prompt input box is displayed on the fingerprint recognition region. In some embodiments, the method further includes a step of receiving account information of the user before receiving the setting instruction of the user, wherein the account information includes a user ID and a password. The setting instruction can be triggered only after the user inputs the correct user ID and password to login a user account, so that the fingerprint information setting security can be improved on one hand, and an effect that different users can be distinguished and different fingerprint information and the corresponding application icons can be saved on one device can be achieved on the other hand.

Then, the process proceeds to a step S202 of acquiring and saving the fingerprint information of the user on the fingerprint recognition region. The collected fingerprint information is the preset fingerprint information when a finger end of the user is in contact with the fingerprint recognition region; and the collected information is stored in the storage unit. In the present embodiment, the device includes the storage unit. The step of "acquiring and saving the fingerprint information of the user on the fingerprint recognition region" includes: whether the fingerprint information in a user setting process is stored in the storage unit is judged; the user is prompted that the fingerprint information is entered when a judgment result is yes; and the fingerprint information is saved to the storage unit when the judgment result is no. In this way, repeated entry of the fingerprint information can be avoided effectively.

Then, the process proceeds to a step S203 of displaying an application list, receiving a selecting instruction of the user for the application icon, and establishing and saving the correspondence between the selected application icon and the acquired fingerprint information. The selecting instruction may be triggered in a mode of clicking to check, double clicking or the like by the user. In this way, the user can set that the applications with more important information security may be encrypted or started only by adopting the fingerprint information according to own needs. For the applications with less important information security, no options are set; and these applications may be started by directly clicking and starting without moving to the fingerprint recognition region for unlocking during starting or decryption.

In some embodiments, the method further includes a step of sending prompt information when the preset fingerprint information matched with the acquired fingerprint information is not recognized. The prompt information includes one or more of voice prompt information, image prompt information, light prompt information and video prompt information. "The preset fingerprint information matched with the acquired fingerprint information is not recognized" usually includes the following two situations: one is that the fingerprint recognition fails, i.e., the fingerprint information is pre-stored in the storage unit, but the collected fingerprint information is not complete due to the finger end of the user is not in full contact with the screen when acquiring the fingerprint information of the user, thereby causing failure of fingerprint recognition; and the other is that the fingerprint information is not stored in the storage unit.

For the first situation, the device may send the voice prompt information or the image prompt information when the preset fingerprint information matched with the acquired fingerprint information is not recognized. The voice prompt information includes voice prompt information for prompting the user to input the fingerprint again. The image prompt information includes pop-up prompt information for prompting the user to input the fingerprint again. It is determined that the fingerprint information is not stored in the storage unit when the number of times for acquiring the fingerprint information inputted by the user exceeds a preset number and the preset fingerprint information matched with the acquired fingerprint information is not recognized.

For the second situation, the device can also send the image prompt information, e.g., a pop-up window prompts the user to enter the current fingerprint information, and can also send the video prompt information, wherein the video prompt information includes a tutorial on how to enter new fingerprint information, and the user can enter the new fingerprint information according to the video prompt information. Certainly, the prompt information can also be realized in a mode of vibration, light sensation prompt or the like. In short, the prompt information is only used for making the user know a situation that "no fingerprint information is matched with the fingerprint information acquired at this time" as soon as possible; and the selection of a prompt information form can be correspondingly adjusted according to settings of different manufacturers.

When the user operates the application icon on the screen, the user may want to start the application corresponding to the application icon, or sort the application icon. In order to distinguish the two, in some embodiments, the method includes: an application icon sorting function is started to sort the application icon when a time of acquiring the fingerprint information of the user on the fingerprint recognition region exceeds a preset time threshold. The process of "sorting the application icon" includes: a coordinate movement instruction of the user for the application icon is received; and the application icon is moved from a current position to a target position. The selection of the preset time threshold may be determined according to actual needs, e.g., it may be determined as a value of 1-3 seconds. The target position may be positions of other application icons in a page where the application icon to be sorted is located, a position of a folder in a page where the application icon to be sorted is located, or positions of the folders or other application icons in other pages beyond the page where the application icon to be sorted is located.

In some embodiments, the fingerprint recognition region includes a plurality of fingerprint recognition sub-regions; and a sensing unit is correspondingly arranged below each of the fingerprint recognition sub-regions. The device further includes a sensing unit control circuit. The method further includes steps of receiving a starting instruction of the user for the fingerprint recognition sub-regions, turning on the sensing units below the fingerprint recognition sub-regions by the sensing unit control circuit, receiving a turn-off instruction of the user for the fingerprint recognition sub-regions, and turning off the sensing units below the fingerprint recognition sub-regions by the sensing unit control circuit.

For example, the number of fingerprint recognition sub-regions is two, then, the two fingerprint recognition sub-regions may be uniformly distributed in the screen up and down or one left and one right, may also be distributed in the screen in other arrangement modes, and specifically may be determined by a shape of the sensing units. For convenience of description, the two fingerprint recognition sub-regions are respectively a first fingerprint recognition sub-region and a second fingerprint recognition sub-region; a first sensing unit is arranged below the first fingerprint recognition sub-region; and a second sensing unit is correspondingly arranged below the second fingerprint recognition sub-region.

An application process of the device with two fingerprint recognition sub-regions is specifically described as follows: during use, the user turns on the first sensing unit below the first fingerprint recognition sub-region by the starting instruction, and turns off the second sensing unit below the second fingerprint recognition sub-region by the turn-off instruction. A second sensor below the second fingerprint recognition sub-region is in a turn-off state, so the fingerprint information is not entered when the finger end of the user operates thereon, and the user can freely move and sort the application icons located in the second fingerprint recognition sub-region. When the user needs to unlock or start the application, only the application icon corresponding to the application needs to be dragged from the second fingerprint recognition sub-region to the first fingerprint recognition sub-region. Because the first sensing unit below the first fingerprint recognition sub-region is in a turn-on state, when the finger end of the user is located in the first fingerprint recognition sub-region, the fingerprint information of the user will be collected synchronously, and then the collected fingerprint information is compared with the preset fingerprint information to realize starting and unlocking of the application. By adopting the above solution, the application icon corresponding to the application to be started is unnecessary to be arranged in a periphery of the fingerprint recognition region at the beginning, and may also be arranged in the fingerprint recognition region. In order to avoid misoperation of the user, only the sensing unit below the fingerprint recognition region needs to be set in the turn-off state by the sensing unit control circuit, thereby effectively improving sensory experience of the user.

Certainly, the user can also set the two fingerprint recognition sub-regions to be in the turn-on state. When the user needs to start the application, the fingerprint information can be collected and compared as long as the application icon is located in any one of the fingerprint recognition sub-regions and then the corresponding application icon is clicked, and the application is started after successful comparison. In a preferred embodiment, a range formed by the two fingerprint recognition sub-regions covers the entire display screen, so that it can be ensured that the application icons on the screen are all within the range of the fingerprint region when the two fingerprint recognition sub-regions are set in the turn-on state; operations of the user are effectively reduced; and the user experience is enhanced.

In other embodiments, the number of fingerprint recognition sub-regions may also be other values, which may be set according to actual needs. The turn-on or turn-off state of the sensing unit below each fingerprint recognition sub-region can be set according to own preferences of the user.

In some embodiments, when the display unit is the LCD screen, a backlight unit is further arranged below the sensing units; and the sensing units are arranged between the backlight unit and the LCD screen. Since the LCD screen is not a self-illuminating component, the backlight unit needs to be added below the sensing units during installation. The backlight unit may be an LCD backlight module or other electronic components having a self-illuminating function. In some other embodiments, when the display unit is the AMOLED display screen, the backlight unit is unnecessary to be provided due to the OLED display screen is a self-illuminating component. By setting the above two solutions, production requirements of different manufacturers can be effectively met; and an application range of the device can be increased.

In the present embodiment, the applications include one or more of images, videos, audios and mobile terminal software. When the applications are the images, videos or audios, the application icons corresponding to the applications may be thumbnails corresponding to the applications, or may also be customized icons to be decrypted. During use, the user can drag the thumbnail or the icon to be decrypted into the fingerprint recognition region to complete the unlocking and then view the corresponding image, video or audio. For the mobile terminal software (e.g., various APPs on the mobile phones), the application icons are icons when downloading the mobile terminal software; and the user can drag these icons into the fingerprint recognition region and start the mobile terminal software after the fingerprint information is successfully matched.

In the present embodiment, each sensing unit includes a TFT image sensing array film. An LCD panel or an OLED (Organic Light Emitting Diode) display panel is driven by a TFT structure to scan a single pixel to realize a display function of a pixel array on the panel. A main structure for forming a TFT switching function is an MOSFET (Metal Oxide Semiconductor Field Effect Transistor), wherein well-known semiconductor layer materials mainly include amorphous silicon, polycrystalline silicon, indium gallium zinc oxide (IGZO), organic compounds mixed with nano carbon materials, etc. Since the structure of a photo-sensing diode can also be prepared from such semiconductor materials, and production equipment is also compatible with the production equipment of TFT arrays, a TFT photo-detecting diode has started to be produced by a TFT array preparation method in recent years. The TFT image sensing array film described in the present embodiment is the above-mentioned TFT photo-detecting diode (e.g., a photo-sensing diode region part in FIG. 4). A specific structure may refer to descriptions on the structure of the sensing unit in a U.S. Pat. No. 6,943,070B2 and a PRC patent CN204808361U. A production process of the TFT image sensing array film is different from that of a TFT structure of the display panel in that an original pixel starting region of the display panel is changed to a photo-sensing in the production process. The TFT may be prepared by a method of using thin glass as a substrate or using a high temperature-resistant plastic material as the substrate, as described in the U.S. Pat. No. 6,943,070B2.

Figure 3:
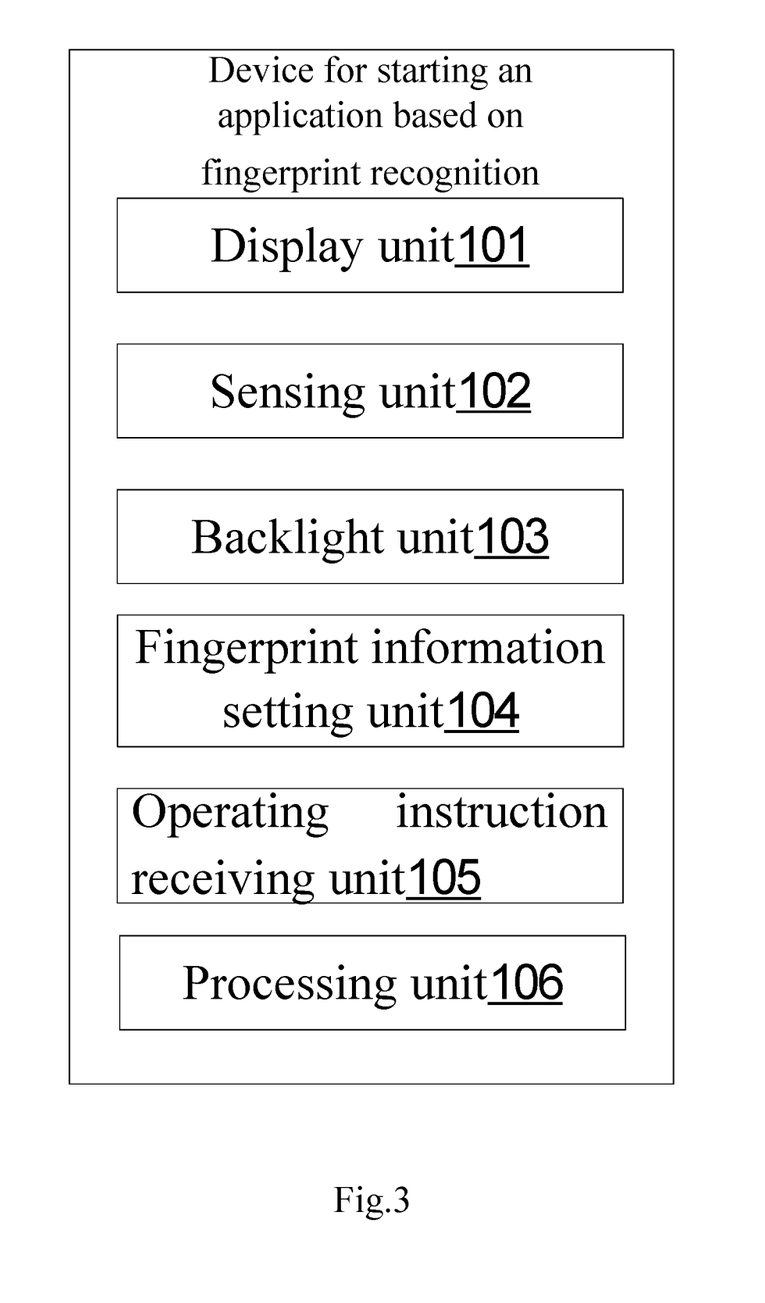
FIG. 3 is a schematic diagram of a device for synchronously starting an application based on fingerprint recognition according to an embodiment of the present invention.

As seen from FIG. 3, it is a schematic diagram of a device for synchronously starting the application based on fingerprint recognition according to an embodiment of the present invention. The device is electronic equipment with a touch display screen, such as a mobile phone, a table computer, a personal digital assistant and other smart mobile equipment, and may also be a personal computer, a computer for industrial equipment or other electronic equipment. The device includes a display unit 101 and sensing units 102, wherein the display unit 101 is provided with a fingerprint recognition region; the sensing units 102 are located below the fingerprint recognition region for acquiring fingerprint information on the fingerprint recognition region; the fingerprint recognition region includes at least one application icon; and each application icon corresponds to one application. The device further includes a fingerprint information setting unit 104, an operating instruction receiving unit 105 and a processing unit 106.

The fingerprint information setting unit 104 is configured to preset a correspondence between the application icon and the fingerprint information. The application icon is a thumbnail of the application; each application icon corresponds to one application; and a starting instruction for the application is triggered when the user clicks on the application icon. The preset fingerprint information is the fingerprint information entered and stored by the user in advance, wherein each fingerprint information may be associated with one or more application icons; and the correspondence between the application icon and the fingerprint information is stored. The correspondence between the application icon and the fingerprint information may be stored in a storage unit of the device, such as a memory of the mobile phone or a hard disk of the computer, and may also be stored in the storage unit of a server. The device only needs to establish a communication connection with the server and then acquires the prestored fingerprint information from the server when the correspondence between the preset application icon and the fingerprint information needs to be acquired. The communication connection includes a wired communication connection or a wireless communication connection.

The operating instruction receiving unit 105 is configured to receive an operating instruction of the user for the application icon in the fingerprint recognition region. In the present embodiment, a coverage of the sensing units is adapted to a size of the display unit, so that the sensing units can collect the fingerprint information of the user in time when the user clicks on and trigger the application icon at any corner of the display unit.

In some embodiments, "the operating instruction receiving unit is configured to receive the operating instruction of the user for the application icon in the fingerprint recognition region" includes: the operating instruction receiving unit is configured to receive a clicking instruction of the user for the application icon and trigger a starting instruction for the application. Specifically, the process is implemented in a mode of setting the correspondence between the number of contacts of the application icon and a touch command, receiving the clicking instruction and triggering the starting instruction for the application when the operating instruction receiving unit detects that the number of contacts meets requirements.

In some other embodiments, "the operating instruction receiving unit is configured to receive the operating instruction of the user for the application icon in the fingerprint recognition region" further includes: the starting instruction is triggered in a mode of setting a preset button, e.g., a "start" button may be additionally displayed on the screen; and the user clicks on the "start" button to trigger the starting instruction for the application corresponding to the application icon after clicking to select the application icon to be moved. In addition, for the device with a mechanical button, the operating instruction of the user on the mechanical button may also be received to trigger the starting instruction for the application after the user selects the application icon corresponding to the application to be unlocked or started.

The sensing units 102 are configured to acquire the fingerprint information of a current user located on the fingerprint recognition region. When the device receives a dragging instruction of the user, a hand of the user moves away from the screen after moving the application icon from an initial position to the fingerprint recognition region, and the sensing units are arranged below the fingerprint recognition region, so the sensing units can synchronously collect the fingerprint information of the user when the hand of the user is located within the range of the fingerprint recognition region. When the device receives a touching instruction of the user, the user can press the fingerprint recognition region by the hand after moving the application icon of the application to be unlocked or started to the fingerprint recognition region, so that the device can receive the fingerprint information of the user.

The processing unit 106 is configured to compare the acquired fingerprint information with the preset fingerprint information corresponding to the application icon, start the application corresponding to the application icon when matching successfully, otherwise not start the application corresponding to the application icon. Comparison of the fingerprint information may be implemented by a fingerprint recognition algorithm, which may be stored in the storage unit of the device. A processor of the device will take the fingerprint recognition algorithm in the storage unit after the sensing units acquire the fingerprint information on the fingerprint recognition region, and compare the acquired fingerprint information with the preset fingerprint information to judge whether the two are matched. The fingerprint recognition algorithm includes steps of fingerprint image preprocessing, data feature extraction, feature matching, fingerprint recognition, etc., and may be implemented by various algorithms. These algorithms are mature existing arts, have been applied to various encryption and decryption fields, and are no longer repeated herein.

In some embodiments, "the fingerprint information setting unit is configured to preset the correspondence between the application icon and the fingerprint information" includes:

the operating instruction receiving unit 105 is configured to receive a setting instruction of the user; and the display unit is configured to display the fingerprint recognition region. The setting instruction may be triggered by clicking on a button in a setting column on the screen by the user. The device will display the fingerprint recognition region after receiving the setting instruction so that the user can input the fingerprint information. In the present embodiment, the process of displaying the fingerprint recognition region may include: the brightness of the fingerprint recognition region is enhanced or a prompt input box is displayed on the fingerprint recognition region. In some embodiments, the process further includes a step of receiving account information of the user before receiving the setting instruction of the user, wherein the account information includes a user ID and a password. The setting instruction can be triggered only after the user inputs the correct user ID and password to login a user account, so that the fingerprint information setting security can be improved on one hand, and an effect that different users can be distinguished and different fingerprint information and the corresponding application icons can be saved on one device can be achieved on the other hand.

The sensing units 102 are configured to acquire and save the fingerprint information of the user on the fingerprint recognition region. The collected fingerprint information is the preset fingerprint information when a finger end of the user is in contact with the fingerprint recognition region; and the collected information is stored in the storage unit. In the present embodiment, the device includes the storage unit 107. The processing unit is further configured to judge whether the fingerprint information in a user setting process is stored in the storage unit after the sensing units acquire the fingerprint information of the user on the fingerprint recognition region, prompt the user that the fingerprint information is entered when a judgment result is yes, and save the fingerprint information to the storage unit when the judgment result is no. In this way, repeated entry of the fingerprint information can be avoided effectively.

The display unit 101 is configured to display an application list; the operating instruction receiving unit 105 is configured to receive a selecting instruction of the user for the application icon; and the processing unit is configured to establish and save the correspondence between the selected application icon and the acquired fingerprint information. The selecting instruction may be triggered in a mode of clicking to check, double clicking or the like by the user. In this way, the user can set that the applications with more important information security may be encrypted or started only by adopting the fingerprint information according to own needs. For the applications with less important information security, no options are set; and these applications may be started by directly clicking and starting without moving to the fingerprint recognition region for unlocking during starting or decryption.

In some embodiments, the processing unit 106 is configured to send prompt information when the preset fingerprint information matched with the acquired fingerprint information is not recognized. The prompt information includes one or more of voice prompt information, image prompt information, light prompt information and video prompt information. "The preset fingerprint information matched with the acquired fingerprint information is not recognized" usually includes the following two situations: one is that the fingerprint recognition fails, i.e., the fingerprint information is pre-stored in the storage unit, but the collected fingerprint information is not complete due to the finger end of the user is not in full contact with the screen when acquiring the fingerprint information of the user, thereby causing failure of fingerprint recognition; and the other is that the fingerprint information is not stored in the storage unit.

For the first situation, the processing unit 106 may send the voice prompt information or the image prompt information when the preset fingerprint information matched with the acquired fingerprint information is not recognized. The voice prompt information includes voice prompt information for prompting the user to input the fingerprint again. The image prompt information includes pop-up prompt information for prompting the user to input the fingerprint again. It is determined that the fingerprint information is not stored in the storage unit when the number of times for acquiring the fingerprint information inputted by the user exceeds the preset number and the preset fingerprint information matched with the acquired fingerprint information is not recognized, i.e., the other situation mentioned above.

For the second situation, the processing unit 106 can also send the image prompt information, e.g., a pop-up window prompts the user to enter the current fingerprint information, and can also send the video prompt information, wherein the video prompt information includes a tutorial on how to enter new fingerprint information, and the user can enter the new fingerprint information according to the video prompt information. Certainly, the prompt information can also be realized in a mode of vibration, light sensation prompt or the like. In short, the prompt information is only used for making the user know a situation that "no fingerprint information is matched with the fingerprint information acquired at this time" as soon as possible; and the selection of a prompt information form can be correspondingly adjusted according to settings of different manufacturers.

When the user operates the application icon on the screen, the user may want to start the application corresponding to the application icon, or sort the application icon. In order to distinguish the two, in some embodiments, the processing unit 106 is further configured to start an application icon sorting function to sort the application icon when a time of acquiring the fingerprint information of the user on the fingerprint recognition region exceeds a preset time threshold. "The processing unit is configured to sort the application icon" includes: the processing unit 106 is configured to receive a coordinate movement instruction of the user for the application icon and move the application icon from a current position to a target position. The selection of the preset time threshold may be determined according to actual needs, e.g., it may be determined as a value of 1-3 seconds. The target position may be positions of other application icons in a page where the application icon to be sorted is located, a position of a folder in a page where the application icon to be sorted is located, or positions of the folders or other application icons in other pages beyond the page where the application icon to be sorted is located.

In some embodiments, the fingerprint recognition region includes a plurality of fingerprint recognition sub-regions; and a sensing unit is correspondingly arranged below each of the fingerprint recognition sub-regions. The device further includes a sensing unit control circuit. The operating instruction receiving unit is further configured to receive a starting instruction of the user for the fingerprint recognition sub-regions. The sensing unit control circuit is configured to turn on the sensing units below the fingerprint recognition sub-regions. The operating instruction receiving unit is configured to receive a turn-off instruction of the user for the fingerprint recognition sub-regions. The sensing unit control circuit is configured to turn off the sensing units below the fingerprint recognition sub-regions.

For example, the number of fingerprint recognition sub-regions is two, then, the two fingerprint recognition sub-regions may be uniformly distributed in the screen up and down or one left and one right, may also be distributed in the screen in other arrangement modes, and specifically may be determined by a shape of the sensing units. For convenience of description, the two fingerprint recognition sub-regions are respectively a first fingerprint recognition sub-region and a second fingerprint recognition sub-region; a first sensing unit is arranged below the first fingerprint recognition sub-region; and a second sensing unit is correspondingly arranged below the second fingerprint recognition sub-region.

An application process of the device with two fingerprint recognition sub-regions is specifically described as follows: during use, the user turns on the first sensing unit below the first fingerprint recognition sub-region by the starting instruction, and turns off the second sensing unit below the second fingerprint recognition sub-region by the turn-off instruction. A second sensor below the second fingerprint recognition sub-region is in a turn-off state, so the fingerprint information is not entered when the finger end of the user operates thereon, and the user can freely move and sort the application icons located in the second fingerprint recognition sub-region. When the user needs to unlock or start the application, only the application icon corresponding to the application needs to be dragged from the second fingerprint recognition sub-region to the first fingerprint recognition sub-region. Because the first sensing unit below the first fingerprint recognition sub-region is in a turn-on state, when the finger end of the user is located in the first fingerprint recognition sub-region, the fingerprint information of the user will be collected synchronously, and then the collected fingerprint information is compared with the preset fingerprint information to realize starting and unlocking of the application. By adopting the above solution, the application icon corresponding to the application to be started is unnecessary to be arranged in a periphery of the fingerprint recognition region at the beginning, and may also be arranged in the fingerprint recognition region. In order to avoid misoperation of the user, only the sensing unit below the fingerprint recognition region needs to be set in the turn-off state by the sensing unit control circuit, thereby effectively improving sensory experience of the user.

Certainly, the user can also set the two fingerprint recognition sub-regions to be in the turn-on state. When the user needs to start the application, the fingerprint information can be collected and compared as long as the application icon is located in any one of the fingerprint recognition sub-regions and then the corresponding application icon is clicked, and the application is started after successful comparison. In a preferred embodiment, a range formed by the two fingerprint recognition sub-regions cover the entire display screen, so that it can be ensured that the application icons on the screen are all within the range of the fingerprint region when the two fingerprint recognition sub-regions are set in the turn-on state; operations of the user are effectively reduced; and the user experience is enhanced.

In other embodiments, the number of fingerprint recognition sub-regions may also be other values, which may be set according to actual needs. The turn-on or turn-off state of the sensing unit below each fingerprint recognition sub-region can be set according to own preferences of the user.

Figure 5:
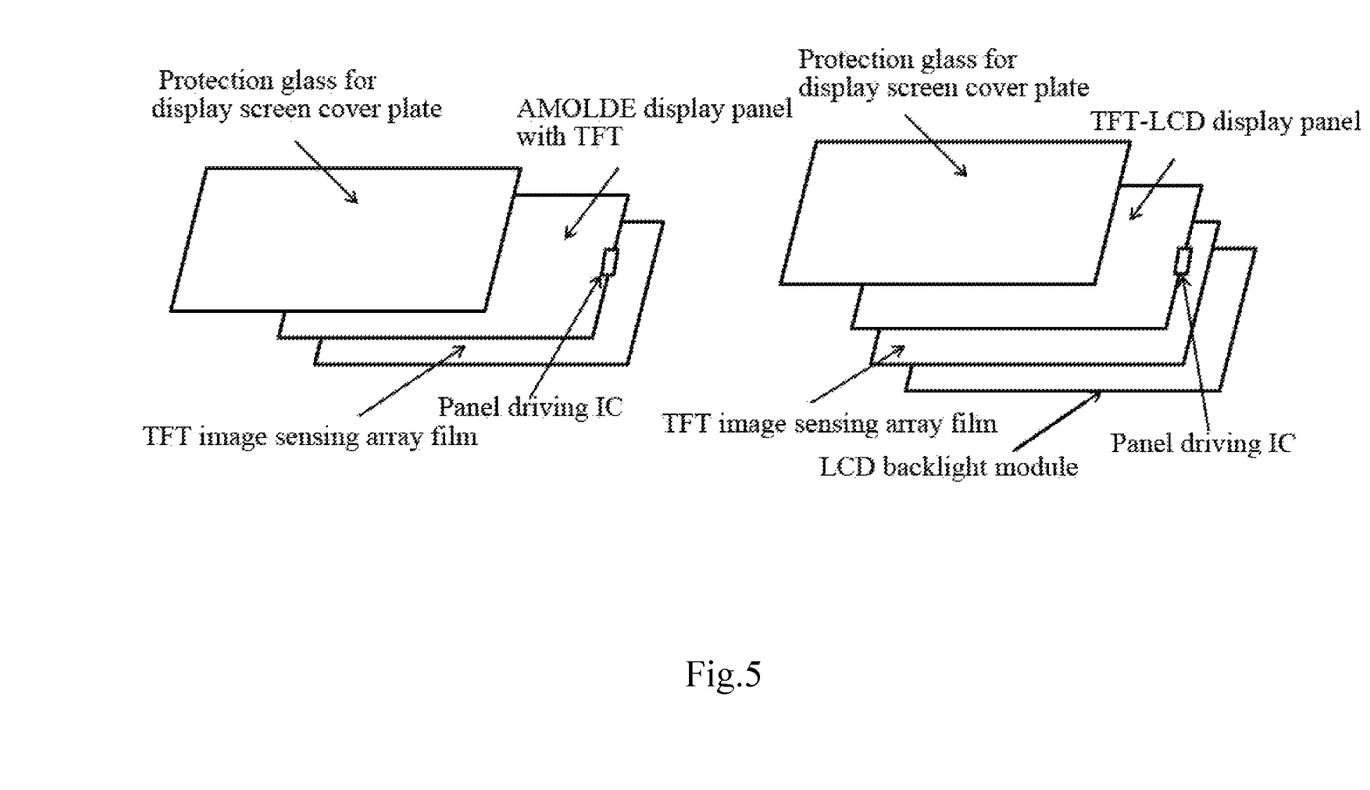
FIG. 5 is a schematic diagram of a device for starting an application based on fingerprint recognition according to another embodiment of the present invention.

As shown in FIG. 5, in some embodiments, the display unit includes an AMOLED display screen or an LCD screen. When the display unit is the LCD screen, a backlight unit is further arranged below the sensing units; and the sensing units are arranged between the backlight unit and the LCD screen. Since the LCD screen is not a self-illuminating component, the backlight unit needs to be added below the sensing units during installation. The backlight unit may be an LCD backlight module or other electronic components having a self-illuminating function. In some other embodiments, when the display unit is the AMOLED display screen, the backlight unit is unnecessary to be provided due to the OLED display screen is a self-illuminating component. By setting the above two solutions, production requirements of different manufacturers can be effectively met; and an application range of the device can be increased.

In the present embodiment, the applications include one or more of images, videos, audios and mobile terminal software. When the applications are the images, videos or audios, the application icons corresponding to the applications may be thumbnails corresponding to the applications, or may also be customized icons to be decrypted. During use, the user can drag the thumbnail or the icon to be decrypted into the fingerprint recognition region to complete the unlocking and then view the corresponding image, video or audio. For the mobile terminal software, the application icons are icons when downloading the mobile terminal software; and the user can drag these icons into the fingerprint recognition region and start the mobile terminal software after the fingerprint information is successfully matched.

Figure 4:
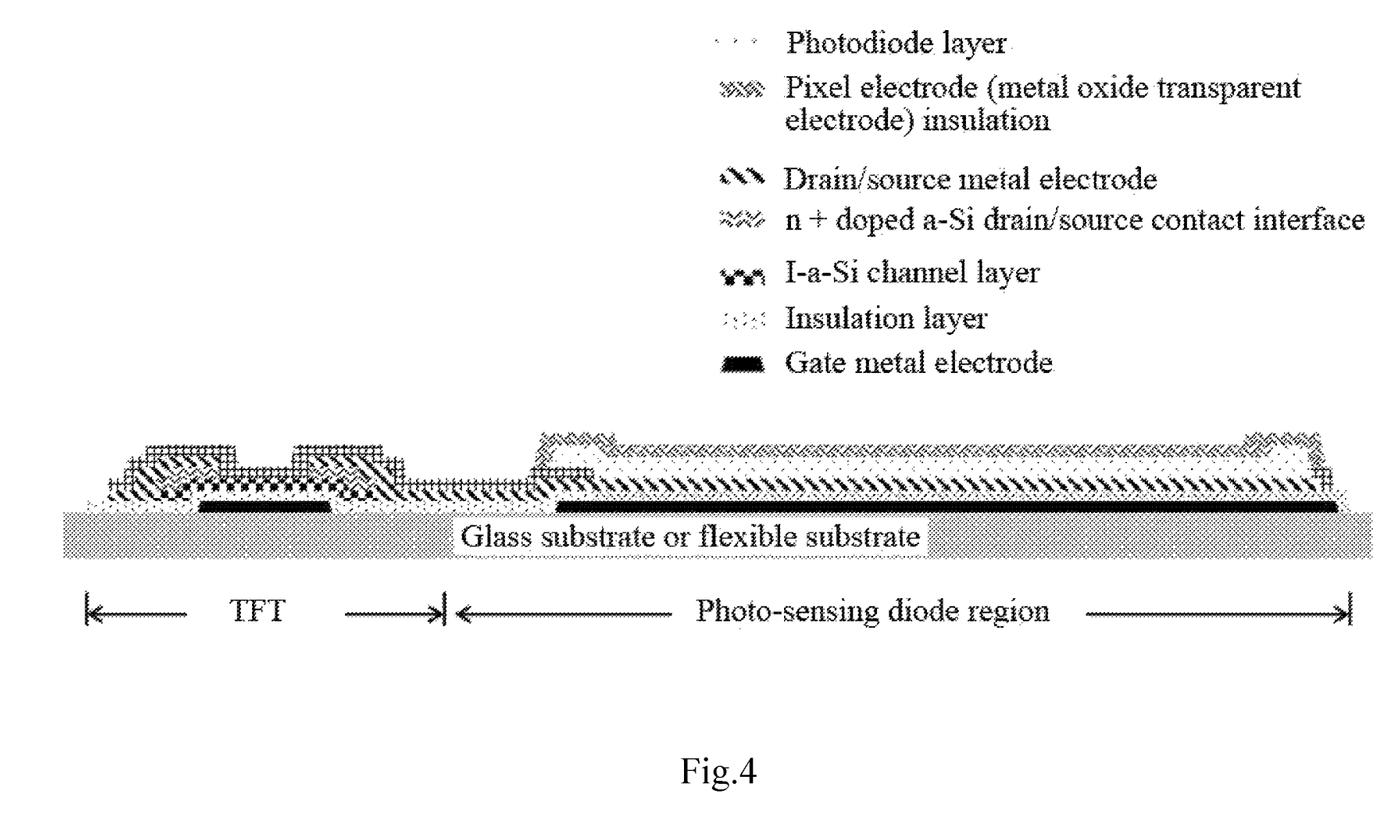
FIG. 4 is a schematic diagram of a sensing unit according to an embodiment of the present invention.

As shown in FIG. 4, in the present embodiment, each sensing unit includes a TFT image sensing array film. An LCD panel or an OLED display panel is driven by a TFT structure to scan a single pixel to realize a display function of a pixel array on the panel. A main structure for forming a TFT switching function is an MOSFET, wherein well-known semiconductor layer materials mainly include amorphous silicon, polycrystalline silicon, IGZO, organic compounds mixed with nano carbon materials, etc. Since the structure of a photo-sensing diode can also be prepared from such semiconductor materials, and production equipment is also compatible with the production equipment of TFT arrays, a TFT photo-detecting diode has started to be produced by a TFT array preparation method in recent years. The TFT image sensing array film described in the present embodiment is the above-mentioned TFT photo-detecting diode (e.g., a photo-sensing diode region part in FIG. 4). A specific structure may refer to descriptions on the structure of the sensing unit in a U.S. Pat. No. 6,943,070B2 and a PRC patent CN204808361U. A production process of the TFT image sensing array film is different from that of a TFT structure of the display panel in that an original pixel starting region of the display panel is changed to a photo-sensing in the production process. The TFT may be prepared by a method of using thin glass as a substrate or using a high temperature-resistant plastic material as the substrate, as described in the U.S. Pat. No. 6,943,070B2.

The present invention has the following advantages: the sensing units are arranged below the fingerprint recognition region of the display unit, so when a user needs to start the application, the sensing units may immediately collect the fingerprint information of the user by only clicking on an icon corresponding to the application to be started on the fingerprint recognition region of the screen, and then compare the collected fingerprint information with the preset fingerprint information to implement starting or unlocking of the application. Compared with a mode that the fingerprint must be verified by the sensor outside the display screen before starting the application in existing mobile terminal equipment, the method provided by the invention improves operability of the user to directly unlock the application icon on the screen by fingerprint and improves the user experience on one hand, and may realize a function of fingerprint recognition in the screen by means of the operability for full-screen, thinned and lightened terminals to meet the needs of the market on the other hand.

It should be noted that the relational terms herein such as first and second are used only to differentiate an entity or operation from another entity or operation, and do not require or imply any actual relationship or sequence between these entities or operations. In addition, term "comprise", "include", or any other variant thereof aims to cover non-exclusive "include", so that a process, method, object, or terminal device that comprises a series of elements not only comprises the elements, but also comprises other elements that are not definitely listed, or further comprises inherent elements of the process, method, object, or terminal device. In a case in which there are no more limitations, an element defined by the sentence "comprise . . . " or "include . . . " does not exclude the case in which other elements further exist in a process, method, or object, or terminal device that comprises the element. In addition, in this text, "greater than", "less than", "exceed", and the like are understood as not including the number. "More", "fewer", "within", and the like are understood as including the number.

A person skilled in the art should understand that the foregoing embodiments may provide a method, an apparatus, a device, or a computer program product. These embodiments may use forms of full hardware embodiments, full software embodiments, or embodiments of a combination of software and hardware aspects. All or some of the steps in the methods involved in the foregoing embodiments may be implemented by using a program instructing relevant hardware. The program may be stored in a computer device readable storage medium for performing all or some of the steps of the methods in the foregoing embodiments. The computer device includes but is not limited to: a personal computer, a server, a general-purpose computer, a dedicated computer, a network device, an embedded device, a programmable device, an intelligent mobile terminal, an intelligent home device, a wearable intelligent device, an in-vehicle intelligent device, and the like. The storage medium includes but is not limited to: a RAM, a ROM, a magnetic disk, a magnetic tape, an optical disc, a flash memory, a USB flash drive, a removable hard disk, a memory card, a memory stick, network server storage, network cloud storage, and the like.

The foregoing embodiments are described with reference to flowcharts and/or block diagrams of the method, the device (the system), and the computer program product in the embodiments. It should be understood that computer program instructions may be used for implementing each process and/or each block in the flowcharts and/or the block diagrams and a combination of a process and/or a block in the flowcharts and/or the block diagrams. These computer program instructions may be provided to a computer of a computer device to generate a machine, so that instructions executed by the processor of the computer device generate an apparatus configured to implement specific functions in one or more processes in the flowcharts and/or in one or more blocks in the block diagrams.

These computer program instructions may further be stored in a computer device readable memory that can instruct the computer device to work in a specific manner, so that the instructions stored in the computer device readable memory generate an artifact that includes an instruction apparatus. The instruction apparatus implements specific functions in one or more processes in the flowcharts and/or in one or more blocks in the block diagrams.

These computer program instructions may further be loaded onto a computer device, so that a series of operations and steps are performed on the computer device, thereby generating computer-implemented processing. Therefore, the instructions executed on the computer device provide steps for implementing specific functions in one or more processes in the flowcharts and/or in one or more blocks in the block diagrams.

Although the foregoing embodiments are described, once a person skilled in the art learns a basic inventive concept, the person skilled in the art may make additional changes and modifications to these embodiments. Therefore, the foregoing descriptions are merely embodiments of the present invention, and are not intended to limit the patent protection scope of the present invention. Any equivalent structural change or any equivalent process change that is made by using the contents of the description and the accompanying drawings of the present invention is directly or indirectly applied to technical fields related thereto, and likewise falls into the patent protection scope of the present invention.

I claim:

1. A method for synchronously starting an application based on fingerprint recognition applied to a device for synchronously starting the application based on fingerprint recognition; wherein the device including a display unit, sensing units and a sensing unit control circuit, wherein the display unit is provided with a fingerprint recognition region, and the display unit is configured to display the fingerprint recognition region, the sensing units are located below the fingerprint recognition region for acquiring fingerprint information on the fingerprint recognition region; wherein the fingerprint recognition region includes at least one application icon, a first fingerprint recognition sub-region and a second fingerprint recognition sub-region; wherein the sensing units comprises a first sensing unit correspondingly arranged below the first fingerprint recognition sub-region and a second sensing unit correspondingly arranged below the second fingerprint recognition sub-region; wherein each application icon corresponds to one application; wherein the method includes the following steps:

presetting a correspondence between the application icon and the fingerprint information;

receiving an operating instruction of the user for the application icon in the fingerprint recognition region, and acquiring the fingerprint information of a current user; judging whether the acquired fingerprint information is successfully matched with the preset fingerprint information corresponding to the application icon; and if yes, starting the application corresponding to the application icon, otherwise not starting the application corresponding to the application icon;

receiving a starting instruction of the user for starting the first fingerprint recognition sub-region; turning on the first sensing unit below the first fingerprint recognition sub-region by the sensing unit control circuit receiving a turn-off instruction of the user for turning off the second fingerprint recognition sub-region; and turning off the sensing units below the second fingerprint recognition sub-region by the sensing unit control circuit;

moving the application icon corresponding to an application from the second fingerprint recognition sub-region to the first fingerprint recognition sub-region;

collecting the fingerprint information of the user by the first sensing unit when a finger of the user is located in the first fingerprint recognition sub-region; and comparing the collected fingerprint information with the preset fingerprint information corresponding to the application icon to determine whether to start the application or not.

2. The method of claim 1, wherein the step of presetting the correspondence between the application icon and the fingerprint information includes:
receiving a setting instruction of the user and displaying the fingerprint recognition region;
acquiring and saving the fingerprint information of the user on the fingerprint recognition region;
displaying an application list, receiving a selecting instruction of the user for the application icon, and establishing and saving the correspondence between the selected application icon and the acquired fingerprint information.

3. The method of claim 1, wherein, the device includes a storage unit; wherein the step of acquiring and saving the fingerprint information of the user on the fingerprint recognition region includes:
judging whether the fingerprint information in a user setting process is stored in the storage unit; when a judgment result is yes, prompting the user that the fingerprint information is entered; and when the judgment result is no, saving the fingerprint information to the storage unit.

4. The method of claim 1, wherein the step of receiving the operating instruction of the user for the application icon in the fingerprint recognition region includes:
receiving a clicking instruction of the user for the application icon and triggering a starting instruction for the application.

5. The method of claim 1, wherein, the method includes the following step:
sending prompt information when the preset fingerprint information matched with the acquired fingerprint information is not recognized.

6. The method of claim 5, wherein, the prompt information includes one or more of voice prompt information, image prompt information, light prompt information and video prompt information.

7. The method of claim 1, wherein, the method includes:
starting an application icon sorting function to sort the application icon when a time of acquiring the fingerprint information of the user on the fingerprint recognition region exceeds a preset time threshold.

8. The method of claim 7, wherein, the process of sorting the application icon includes: receiving a coordinate movement instruction of the user for the application icon, and moving the application icon from a current position to a target position.

9. The method of claim 1, wherein the display unit includes an Active Matrix Organic Light Emitting Diode (AMOLED) display screen or a Liquid Crystal Display (LCD) screen.

10. The method of claim 9, wherein, when the display unit is the LCD screen, a backlight unit further arranged below the sensing units and the sensing units arranged between the backlight unit and the LCD screen.

11. The method of claim 1, wherein, each sensing unit includes a TFT (Thin Film Transistor) image sensing array film.

12. The method of claim 1, wherein, the application includes one or more of images, videos, audios and mobile terminal software.

13. A device for synchronously starting an application based on fingerprint recognition including a display unit and sensing units, wherein the display unit is provided with a fingerprint recognition region, and the display unit is configured to display the fingerprint recognition region; wherein the sensing units are located below the fingerprint recognition region for acquiring fingerprint information on the fingerprint recognition region; wherein the fingerprint recognition region includes at least one application icon, a first fingerprint recognition sub-region and a second fingerprint recognition sub-region; wherein the sensing units comprises a first sensing unit correspondingly arranged below the first fingerprint recognition sub-region and a second sensing unit correspondingly arranged below the second fingerprint recognition sub-region; and each application icon corresponds to one application; wherein the device further includes a fingerprint information setting unit, an operating instruction receiving unit and a processing unit;
wherein the fingerprint information setting unit is configured to preset a correspondence between the application icon and the fingerprint information;
wherein the operating instruction receiving unit is configured to receive an operating instruction of the user for the application icon in the fingerprint recognition region;
wherein the sensing units are configured to acquire the fingerprint information of a current user located on the fingerprint recognition region;
wherein the processing unit is configured to judge whether the acquired fingerprint information is successfully matched with the preset fingerprint information corresponding to the application icon, and if yes, start the application corresponding to the application icon, otherwise not start the application corresponding to the application icon;
wherein, the device further includes a sensing unit control circuit wherein the operating instruction receiving unit is further configured to receive a starting instruction of the user for starting the first fingerprint recognition sub-region; wherein the sensing unit control circuit is configured to turn on the first sensing unit below the first fingerprint recognition sub-region; wherein the operating instruction receiving unit is configured to receive a turn-off instruction of the user for turning off the second fingerprint recognition sub-region; wherein the sensing unit control circuit is configured to turn off the second sensing unit below the second fingerprint recognition sub-region by the sensing unit control circuit;
wherein the application icon corresponding to an application is moved from the second fingerprint recognition sub-region to the first fingerprint recognition sub-region, the first sensing unit is further configured to collect the fingerprint information of the user when a finger of the user is located in the first fingerprint recognition sub-region; and
the processing unit is further configured to compare the collected fingerprint information with the preset fingerprint information corresponding to the application icon to determine whether to start the application or not.

14. The device of claim 13, wherein, the fingerprint information setting unit is configured to preset the correspondence between the application icon and the fingerprint information includes:
the operating instruction receiving unit configured to receive a setting instruction of the user;

the sensing units configured to acquire and save the fingerprint information of the user on the fingerprint recognition region;

the display unit configured to display an application list;

wherein the operating instruction receiving unit is configured to receive a selecting instruction of the user for the application icon; wherein the processing unit is configured to establish and save the correspondence between the selected application icon and the acquired fingerprint information.

15. The device of claim 14, wherein, the device includes a storage unit; wherein the processing unit is further configured to judge whether the fingerprint information in a user setting process is stored in the storage unit after the sensing units acquire the fingerprint information of the user on the fingerprint recognition region, prompt the user that the fingerprint information is entered when a judgment result is yes, and save the fingerprint information to the storage unit when the judgment result is no.

16. The device of claim 13, wherein the operating instruction receiving unit is configured to receive the operating instruction of the user for the application icon in the fingerprint recognition region includes: the operating instruction receiving unit configured to receive a clicking instruction of the user for the application icon and trigger a starting instruction for the application.

17. The device of claim 13, wherein, the processing unit is configured to send prompt information when the preset fingerprint information matched with the acquired fingerprint information is not recognized.

18. The device of claim 17, wherein, the prompt information includes one or more of voice prompt information, image prompt information, light prompt information and video prompt information.

19. The device of claim 13, wherein, the processing unit is configured to start an application icon sorting function to sort the application icon when a time of acquiring the fingerprint information of the user on the fingerprint recognition region exceeds a preset time threshold.

20. The device of claim 19, wherein, the processing unit is configured to sort the application icon" includes: the processing unit configured to receive a coordinate movement instruction of the user for the application icon and move the application icon from a current position to a target position.

21. The device of claim 13, wherein, the display unit includes an AMOLED display screen or an LCD screen.

22. The device of claim 21, wherein, when the display unit is the LCD screen, a backlight unit is further arranged below the sensing units and the sensing units are arranged between the backlight unit and the LCD screen.

23. The device of claim 13, wherein, each sensing unit includes a TFT image sensing array film.

24. The device of claim 13, wherein, the application includes one or more of images, videos, audios and mobile terminal software.

25. The method of claim 4, wherein the step of receiving the operating instruction of the user for the application icon in the fingerprint recognition region includes:

setting the correspondence between the number of contacts of the application icon and a touch command;

receiving the clicking instruction and triggering the starting instruction for the application when detecting that the number of contacts meets requirements.

26. The device of claim 16, wherein the operating instruction receiving unit is configured to receive the operating instruction of the user for the application icon in the fingerprint recognition region includes:

setting the correspondence between the number of contacts of the application icon and a touch command;

receiving the clicking instruction and triggering the starting instruction for the application when the operating instruction receiving unit detects that the number of contacts meets requirements.

\* \* \* \* \*